United States Patent [19]
Jansson

[11] 4,407,413
[45] Oct. 4, 1983

[54] DISPLAY PACK

[75] Inventor: Erik C. Jansson, Enköping, Sweden

[73] Assignee: Aktiebolaget Bahco Verktyg, Enköping, Sweden

[21] Appl. No.: 405,721

[22] Filed: Aug. 6, 1982

Related U.S. Application Data

[63] Continuation of Ser. No. 254,587, Apr. 14, 1981, abandoned.

[30] Foreign Application Priority Data

Apr. 18, 1980 [SE] Sweden ............................ 8002935

[51] Int. Cl.³ ............................................. B65D 73/00
[52] U.S. Cl. ..................................... 206/493; 24/214; D8/388
[58] Field of Search ............... 24/214, 213 CS, 213 B, 24/213 R, 297; D8/388

[56] References Cited

U.S. PATENT DOCUMENTS 3,210,820 10/1965 Humiston .............................. 24/214
3,249,973 5/1966 Seckerson ............................. 24/214

Primary Examiner—Joseph Man-Fu Moy
Attorney, Agent, or Firm—Christel, Bean & Linihan

[57] ABSTRACT

A hanging display pack comprises a packing plate or lamina on which an article having a hole is mounted. The lamina has a hole disposed in respect of size and position for coaction with the article's hole. A locking body similar to the male part of a press stud is adapted for insertion through the holes of the lamina and article to lock them to each other and has therefore a projection at one end for preventing the body from being pushed through the lamina, and at its opposing insertion end it has snap teeth resiliently adapted for snapping out after they have been inserted through the hole in the article. The body is made from elastic material and has a substantially cylindrical form with a hemispherical top and is open at its base. At its top it has one or more through slits which are disposed on or parallel to a line between two mutually opposing areas occupied by the snap teeth.

2 Claims, 4 Drawing Figures

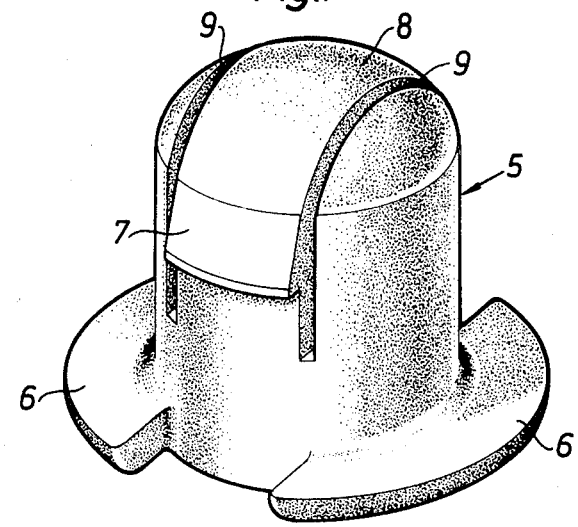
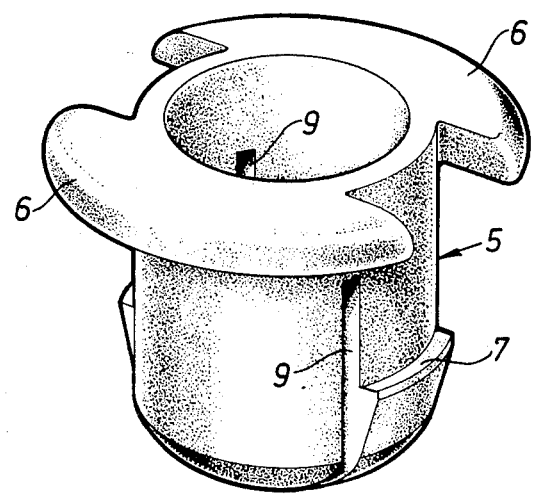

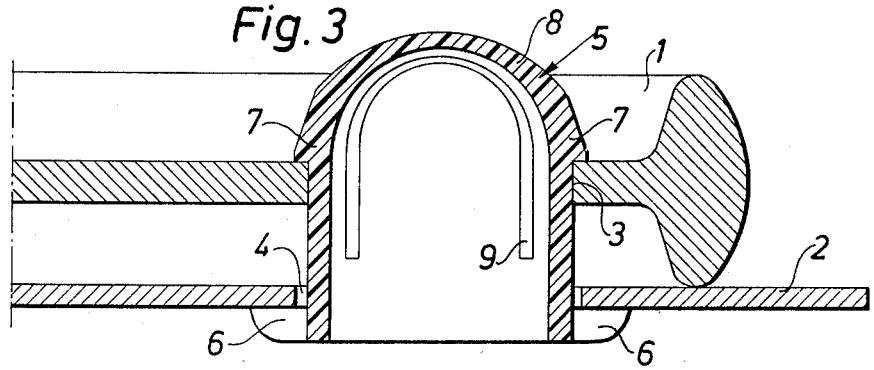
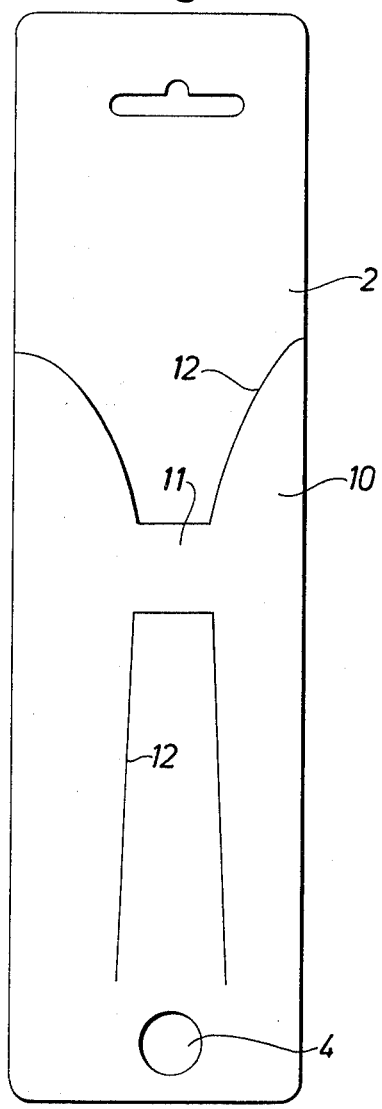

DISPLAY PACK

This is a continuation of application Ser. No. 254,587 filed Apr. 14, 1981, now abandoned.

The invention relates to a hanging display pack comprising a backing plate or lamina preferably with attachment details such as buckles, eyelets, pockets etc. for removable retention of an article on the lamina, the article having a preferably circular hole in a portion thereof situated substantially parallel to the lamina, which has a hole adapted in respect of size and position for coaction with the article's hole, there being a locking body adapted for insertion through the hole of the lamina and the hole of the article, and substantially filling out said hole for mutually locking the lamina and article together by means of a flange-like projection preventing said body from going completely through the hole of the lamina, said projection thus being situated on the side of the lamina facing away from the article, said body also having snap teeth at its insertion end, said teeth being resiliently adapted for snapping out after they have been inserted through the article's hole, when they will be situated on the side of the article facing away from the lamina, said body being made from elastic material, preferably plastics.

This kind of pack, which is to be found on the market, has the lamina made of carton and has a buckle or clip formed in an exterior carton layer which is intended to accommodate an article such as an adjustable wrench. The hole in the article can be the hanging hole of the wrench shank.

Hanging packs of this kind are used to a considerable extent for displaying and stocking articles in self-service shops and stores.

However, it has unfortunately been found that there occurs an unacceptable loss in goods, due to a large extent to the article itself being taken, while the lamina has been left on the hook at the place of display.

The object of the invention is to make it more difficult to separate the article from the lamina and thereby make taking the article itself more time-consuming. It is thus assumed that taking the whole pack is less attractive, due to such a unit being considerably more voluminous than the article itself.

The intended anchoring of the article to the pack is obtained if the hanging display pack is given the characterizing features apparent from the following claim 1.

One embodiment of the invention will now be described in detail in the following with reference to the accompanying drawings whereon FIG. 1 is a perspective view of a locking body associated with the pack, FIG. 2 is a perspective view from the opposite direction of the locking body in FIG. 1, FIG. 3 is a detail section through the lamina, the article mounted thereon and the locking body in FIGS. 1 and 2 and FIG. 4 is a plan view of the lamina in FIG. 3.

The hanging display pack carries an article suitably in the form of an adjustable wrench 1 and mainly comprises a lamina 2 of carton. The shank of the wrench is disposed parallel and adjacent to the lamina and has a circular hole 3, suitably constituting a hanging hole for the wrench, when it has been removed from the pack and taken into use.

The lamina 2 has a hole 4 disposed in respect of size and position for co-action with the hole 3 of the article 1. A locking body 5, which is similar to the male part of a press stud, is adapted for insertion through the respective holes 4 and 5 of the lamina 2 and article 1. In its inserted position it substantially fills out the article's hole 3. The body locks the article 1 to the lamina 2 by means of a flange-like projection 6 preventing the body to be thrust completely through the lamina 2, and by snap teeth 7 which are resiliently adapted for snapping out after they have been pushed through the hole 3. The locking body has the snap teeth 7 arranged at its insertion end and the projection 6 at its opposite end. The projection 6 will thus be situated on the side of the lamina 2 facing away from the article 1 and the teeth 7 will be on the side of the article 1 facing away from the lamina 2. The distance between these retaining parts is suited to the thickness obtained when the article lies against the lamina 2.

The locking body is made from elastic material, suitably plastics, and is formed as a partially circular cupola, which is completely open at its base and provided with the flange-like projection 6, while at its opposite end, i.e. the insertion end, it has a hemispherical top 8.

Two through slits 9 are made in the body 5. They are localized to the hemispherical top 8 and extend a distance downwards in the cylindrical portion of the cupola. The slits 9 are symmetrically disposed on either side of and parallel to a line extending between two mutually opposing areas occupied by the snap teeth 7.

In order to release the locking body, pressure must thus be applied against the sides thereof along this line, which is thus disposed substantially parallel to or preferably completely parallel to the slits 9, which is the case in the embodiment illustrated, where the line in question is a line of symmetry in the cross section through the snap teeth in the locking body. The body can thus not be released in the ways which appear obvious at a quick glance, namely axial pressure against the top 8 of the cupola, or radial inward compression transverse the direction of the slits 9.

As will already have been noted above, the solution is well suited for use in an otherwise conventional hanging display pack, e.g. one for adjustable wrenches according to FIG. 4. This pack has a lamina 2 made up from two layers of carton, of which the upper one 10 forms a clip 11 through which the wrench shank is inserted from above, and also side supports 12 for the shank. (The lamina has been schematically depicted simply in FIG. 3). The known lamina has thus been provided with the hole 4 for the locking body 5 for more secure retention of the adjustable wrench.

The projection 6 on the body 5 has two notches opposite the snap teeth 7. The body is more simply produced when formed in this mode, and the notches can also serve as guides for it when applying it to display packs by machine.

For more secure locking of the body to the article and lamina, the cavity in the body can be filled with some solidifying composition or with a plastic plug (not shown). For protection against theft, the locking body can also be utilized for enclosing a signal means in its material or in its cavity.

I claim:

1. A hanging display pack comprising a backing plate or lamina preferably with attachment details such as buckles, eyelets, pockets etc. for removable retention of an article on the lamina, the article having a preferably circular hole in a portion thereof situated substantially parallel to the lamina, which has a hole adapted in respect of size and position for coaction with the hole of the article, there being a locking body adapted for insertion through the hole of the lamina and the hole of the article, and substantially filling out said hole for mutually locking the lamina and article together by means of a flange like projection preventing said body from going completely through the hole of the lamina, said projection thus being situated on the side of the lamina facing away from the article, said body also having snap teeth at its insertion end, said teeth being resiliently adapted for snapping out after they have been inserted through the hole of the article, when they will be situated on the side of the article facing away from the lamina, said body being made from elastic material, preferably plastics, characterized in that said body is formed as a cupola with a substantially cylindrical portion, at its base provided with said projection and at its opposing end having a hemispherical top, forming its insertion end, said teeth being located along two mutually opposing areas along the circumference of said cylindrical portion and the remainder of the circumference being without teeth, and formed with at least one through-slit, which is disposed on or parallel to a line, preferably a line of symmetry, between said two mutually opposing areas having the snap teeth such that in order to release said locking body pressure must be applied against the sides of said cylindrical portion in a direction substantially parallel to said line.

2. A hanging display pack in accordance with claim 1, characterized in that there are two slits which extend a distance downwards towards the base along the sides of said cupola.

* * * * *